(12) United States Patent
Chu et al.

(10) Patent No.: US 7,713,420 B2
(45) Date of Patent: May 11, 2010

(54) ION EXCHANGE RESIN TOWER AND DETECTION METHOD OF LIFETIME OF RESIN THEREIN

(75) Inventors: Ching-Wei Chu, Hsinchu (TW); Cheng-Wen Li, Hsinchu (TW); Chien-Chang Yang, Hsinchu (TW); Chang-Lung Pan, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 72 days.

(21) Appl. No.: 12/025,787

(22) Filed: Feb. 5, 2008

(65) Prior Publication Data

US 2009/0114586 A1    May 7, 2009

(30) Foreign Application Priority Data

Nov. 5, 2007   (TW) .............................. 96141658 A

(51) Int. Cl.
 *B01J 15/00* (2006.01)
(52) U.S. Cl. ..................................................... 210/662
(58) Field of Classification Search ................ 210/662, 210/263
 See application file for complete search history.

(56) References Cited

U.S. PATENT DOCUMENTS

| | | | | |
|---|---|---|---|---|
| 3,172,037 A | * | 3/1965 | Pfeiffer ................... | 205/793.5 |
| 3,969,243 A | * | 7/1976 | Arion ......................... | 210/662 |
| 4,277,332 A | * | 7/1981 | Baughn ...................... | 210/96.2 |
| 4,320,010 A | * | 3/1982 | Tucci et al. ................. | 210/662 |
| 4,379,711 A | * | 4/1983 | Satchell, Jr. ................. | 436/82 |
| 4,917,794 A | | 4/1990 | Fettes et al. | |
| 5,078,853 A | * | 1/1992 | Manning et al. ............ | 204/616 |
| 5,308,451 A | * | 5/1994 | Carland ...................... | 202/158 |
| 5,680,055 A | * | 10/1997 | Seitz et al. .................. | 324/715 |
| 5,811,012 A | * | 9/1998 | Tanabe et al. .............. | 210/669 |
| 6,790,362 B2 | * | 9/2004 | FitzGerald et al. .......... | 210/662 |
| 6,926,835 B2 | * | 8/2005 | Iizuka et al. ................ | 210/662 |
| 2004/0238417 A1 | * | 12/2004 | Arakawa et al. ............. | 210/85 |
| 2005/0176089 A1 | * | 8/2005 | Ehrlich ...................... | 435/40.5 |

OTHER PUBLICATIONS

Article Titled "Using organic extracting agent to desorb uranium in continuous countercurrent ion exchange equipment", jointly authored by Yang et al., in Li Zi Jiao Huan Yu Xi Fu, vol. 5, No. 3, 1989 (pp. 206~210).

* cited by examiner

*Primary Examiner*—Chester T Barry
(74) *Attorney, Agent, or Firm*—Jianq Chyun IP Office

(57) ABSTRACT

An ion exchange resin tower including a tank, a supply line, an output line, and a plurality of sampling tubes is provided. The supply line guides a liquid into the tank, such that an ion exchange occurs between the liquid and the ion exchange resin in the tank. The processed liquid is guided out of the tank via the output line. The sampling tubes are disposed on a sidewall of the tank to sample the liquid flowing through the resin.

12 Claims, 3 Drawing Sheets

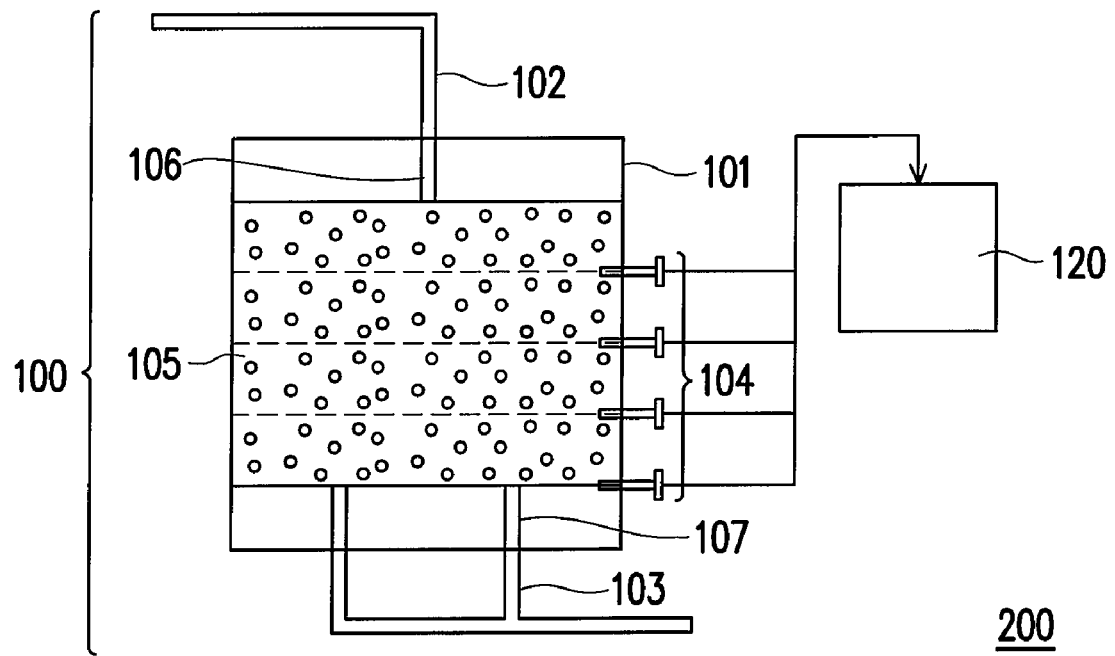

FIG. 3

```
┌─────────────────────────────────────────────────────────────┐
│ Judging whether the ion exchange resin at different horizontal height │──S401
│ levels is saturated or not according to the liquid sampled by each    │
│                  of the sampling tubes                                │
└─────────────────────────────────────────────────────────────┘
                              │
                              ▼
┌─────────────────────────────────────────────────────────────┐
│ Calculate an use time of the ion exchange resin when the liquid │──S402
│ sampled by at each of the sampling tubes shows the ion exchange │
│        resin at one horizontal height level is saturated        │
└─────────────────────────────────────────────────────────────┘
                              │
                              ▼
┌─────────────────────────────────────────────────────────────┐
│ Estimate the remaining lifetime of the ion exchange resin according │──S403
│                        to the use time                              │
└─────────────────────────────────────────────────────────────┘
```

FIG. 4

ION EXCHANGE RESIN TOWER AND DETECTION METHOD OF LIFETIME OF RESIN THEREIN

CROSS-REFERENCE TO RELATED APPLICATION

This application claims the priority benefit of Taiwan application serial no. 96141658, filed on Nov. 5, 2007. The entirety of the above-mentioned patent application is hereby incorporated by reference herein and made a part of this specification.

BACKGROUND OF THE INVENTION

1. Field of the Invention

The present invention relates to a water-quality detection device and a method for detecting the lifetime thereof, and more particularly, to an ion exchange resin tower and a detection method of the lifetime of the resin therein.

2. Description of Related Art

A water purification system is capable of removing impurities in water, including suspensions, particles, organics, microorganisms, electrolytes, and gases, etc., to improve the resistance of the pure water to a limit level, so as to ensure the high water purity. Generally, the resistance of pure water is substantially greater than 18 MΩ-cm, the higher the resistance is, the fewer the ions in the water are, that is, the higher the water quality is.

An ion exchange resin tower is a unit of the water purification system for removing ions from the water effectively. For example, a cation exchange resin is used to exchange cation functional groups with cations in the water, such as $Ca^{2+}$ and $Mg^{2+}$, so as to reduce the concentration of $Ca^{2+}$ and $Mg^{2+}$ in water. During the ion exchange process, the resin gradually adsorbs $Ca^{2+}$ and $Mg^{2+}$ and accumulates them to reach a certain amount to become saturated, and thus it cannot perform ion exchange any more, and at this time, the resin must be renewed, regenerated or replaced.

The lifetime of the resin is affected by many variations, for example, quality of pre-processed water, water flow in resin and so on. Therefore, if the resin is renewed according to the lifetime suggested by the manufacturer, it may be done prior to the saturation, and thus increasing the cost. Therefore, acquiring the exact time for the resin to get saturated is surely beneficial for reducing the cost.

As for the method of measuring the saturation of the resin, a method for obtaining the saturation of a resin by a probe disposed in a tank is provided in the prior art, in which the probe is used to detect the resistance of the water there around, when the resistance is lower than a certain default value, it indicates that the resin is saturated and fails to perform ion exchange, so the resin must be renewed.

However, as the probe is located in the tank, merely the saturation of the resin can be determined through using the resistance of the water, but the water cannot be sampled for further analysis about other chemical properties or physical properties. If the contaminations in the water cannot be detected by the probe, the deterioration of water quality caused by the contaminations that cannot be detected through the conventional method as well.

SUMMARY OF THE INVENTION

Accordingly, the present invention is directed to an ion exchange resin tower having sampling tubes for sampling a liquid while the liquid flows through the ion exchange resin.

The present invention is directed to provide a detection system for detecting a liquid in the sampling tubes to ensure liquid quality.

The present invention provides a detection method for estimating a lifetime (remaining lifetime) of the ion exchange resin in the resin tower according to the liquid sampled by the sampling tubes.

As embodied and broadly described herein, the present invention provides an ion exchange resin tower applicable for processing a liquid. The ion exchange resin tower includes a tank, a supply line, an output line, and a plurality of sampling tubes. The tank has an ion exchange resin to absorb ions in the liquid. The supply line is connected to a top portion of the tank so as to introduce a liquid into the tank. The output line is connected to a bottom portion of the tank so as to introduce the processed liquid out of the tank. The plurality of sampling tubes is disposed on a sidewall of the tank, and each of the sampling tubes is respectively disposed at a different vertical height level to sample the liquid in the ion exchange resin.

In an embodiment of the present invention, the liquid includes water.

In an embodiment of the present invention, the ion exchange resin tower further includes a plurality of distribution pipes connected to the supply line and located between the ion exchange resin and the supply line.

In an embodiment of the present invention, the ion exchange resin tower further includes a plurality of water-collecting pipes connected to the output line and located between the ion exchange resin and the output line.

In an embodiment of the present invention, the sampling tubes are substantially distributed on the same vertical line.

In an embodiment of the present invention, the sampling tubes are substantially distributed on different vertical lines.

In an embodiment of the present invention, the differences between vertical height levels of the sampling tubes are substantially the same.

In an embodiment of the present invention, the sampling tubes are removable from the sidewall of the tank.

In an embodiment of the present invention, the ion exchange resin tower further includes an end sampling tube corresponding to a junction point between the output line and the tank.

The present invention provides a detection system, including the ion exchange resin tower described above and a detection unit. The detection unit is used for detecting the liquids sampled by the sampling tubes in the ion exchange resin tower.

In an embodiment of the present invention, the detection unit includes a probe electrode.

The present invention provides a detection method for calculating a lifetime (remaining lifetime) of the ion exchange resin in the above-mentioned ion exchange resin tower. The detection method includes the following two steps: first, judging whether the ion exchange resin at different vertical height levels is saturated or not according to the liquid sampled by each of the sampling tubes; next, calculating a used lifetime of the ion exchange resin when the liquid sampled by each of the sampling tubes shows the ion exchange resin at one vertical height level is saturated. Ultimately, the remaining lifetime of the ion exchange resin is estimated according to the used lifetime.

In an embodiment of the present invention, the process for determining whether the ion exchange resin is saturated or not includes measuring whether the resistance of the liquid exceeds a default value or not.

In an embodiment of the present invention, the default value is about 18 MΩ-cm.

According to the embodiments of the present invention, the ion exchange resin tower has sampling tubes for sampling the liquid, which is capable of both monitoring the water quality in real time and further performing a precise analysis on the liquid. Furthermore, whether the resin at different heights is saturated or not can be analyzed through using the liquid sampled at different heights, so as to further evaluate the lifetime (remaining lifetime) of the resin, which thus serves as a reference for renewing the resin. Therefore, the ion exchange resin tower of the present invention and the detection system thereof can monitor the water quality and they are beneficial for saving the cost.

In order to make the aforementioned and other objects, features and advantages of the present invention comprehensible, embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a schematic view of a detection system according to a third embodiment of the present invention.

FIG. 4 is a flow chart of a detection method according to the present invention.

DESCRIPTION OF EMBODIMENTS

Figure 1:
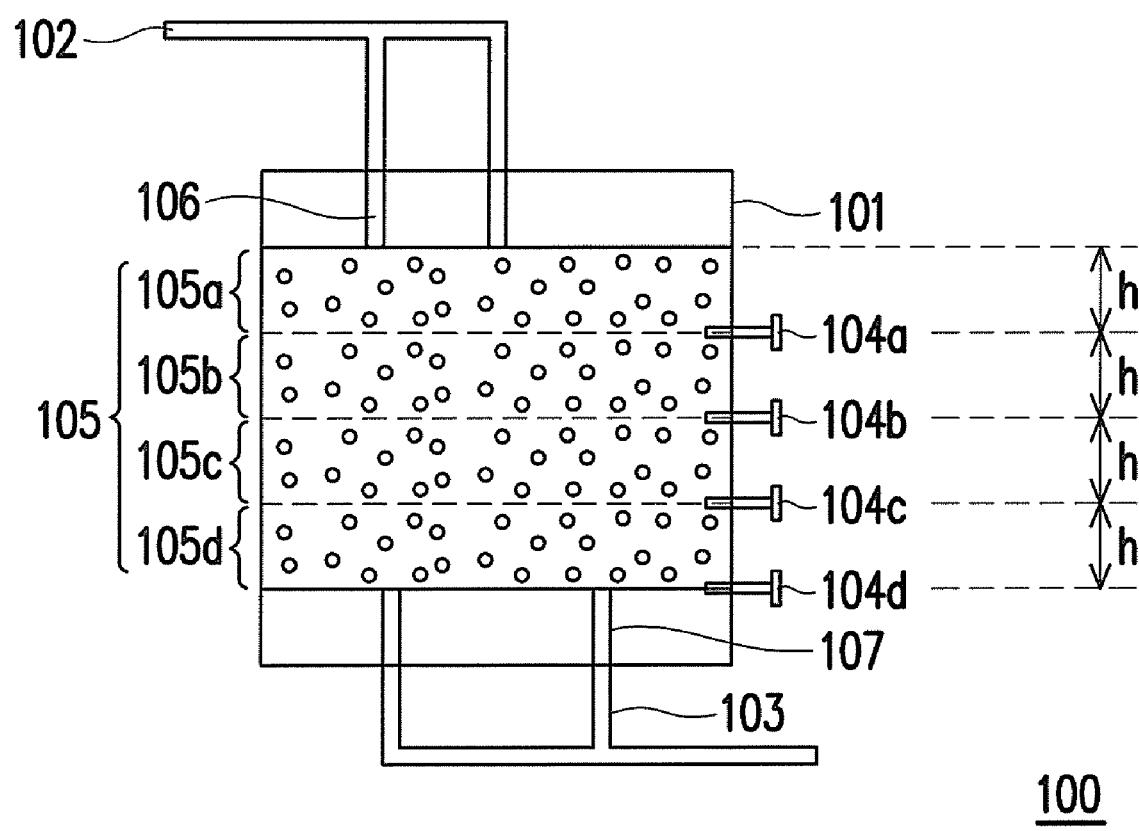
FIG. 1 is a schematic view of an ion exchange resin tower according to a first embodiment of the present invention.
Figure 2:
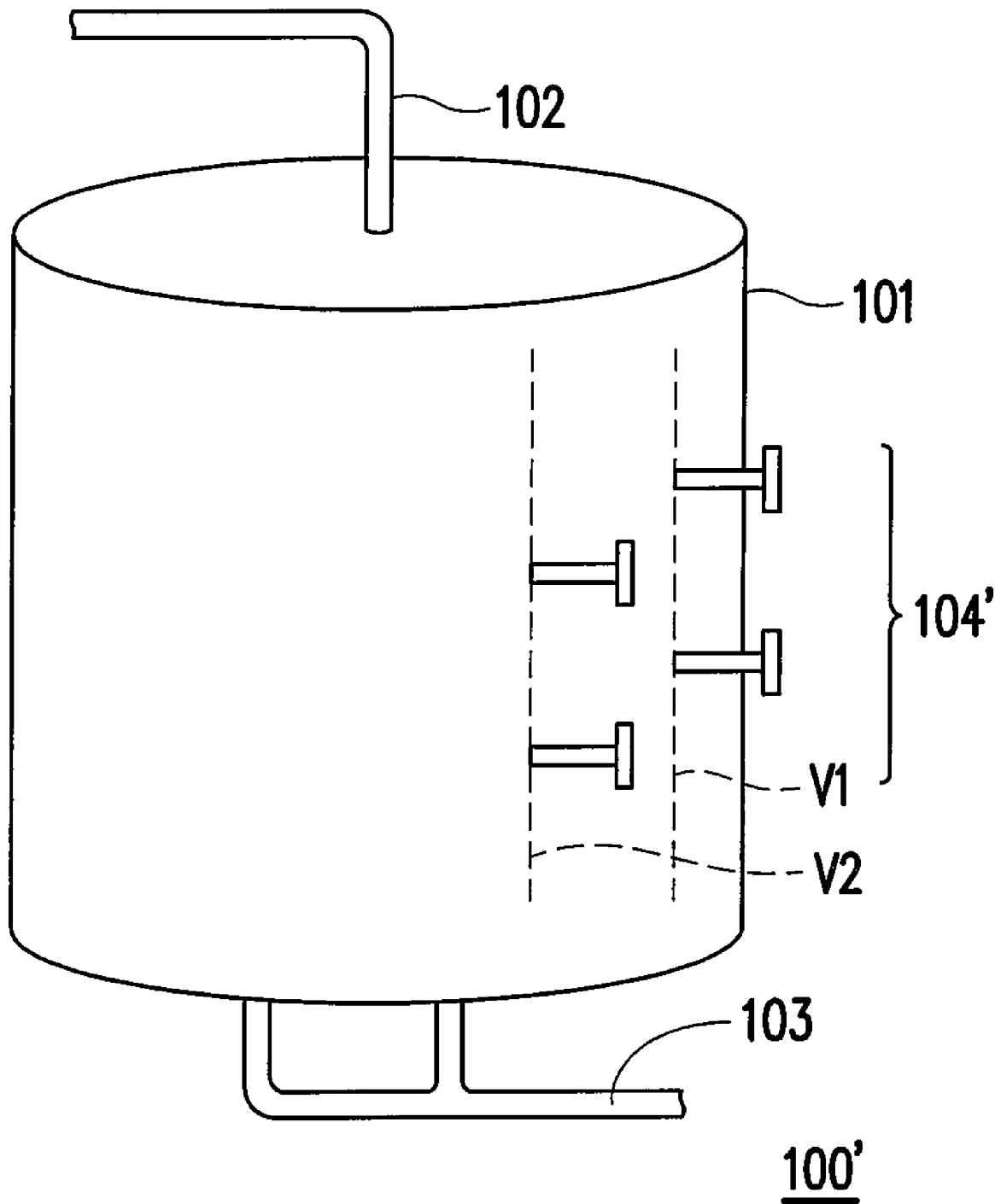
FIG. 2 is a schematic view of an ion exchange resin tower according to a second embodiment of the present invention.

FIG. 1 is a schematic view of an ion exchange resin tower according to a first embodiment of the present invention. FIG. 2 is a schematic view of an ion exchange resin tower according to a second embodiment of the present invention.

Referring to FIG. 1, an ion exchange resin tower 100 of this embodiment is applicable for processing a liquid, for example, water. The ion exchange resin tower 100 includes a tank 101, a supply line 102, an output line 103, and a plurality of sampling tubes 104a, 104b, 104c, and 104d. The tank 101 has an ion exchange resin 105 therein for absorbing ions in the liquid. The ion exchange resin 105 is, for example, a colloid, a porous colloid, or a macro-porous cation exchange resin, or anion exchange resin. The supply line 102 is connected to a top portion of the tank 101, and the output line 103 is connected to a bottom portion of the tank 101. Furthermore, a plurality of distribution pipes 106 connected to the supply line 102 is located between the supply line 102 and the ion exchange resin 105, and a plurality of water-collecting pipes 107 connected to the output line 103 is located between the ion exchange resin 105 and the output line 103. The sampling tubes 104a, 104b, 104c, and 104d are disposed on a sidewall of the tank 101 at different vertical height levels, so as to sample the liquid in the ion exchange resin 105 at different heights.

In this embodiment, the sampling tubes 104a, 104b, 104c, and 104d are disposed on a sidewall of the tank 101 on the same vertical line with an equal distance h there-between. The distance between the sampling tube 104a and the top portion of the ion exchange resin 105 is also h, and the sampling tube 104d is located at a horizontal line corresponding to the bottom portion of the ion exchange resin.

However, the arrangement of the sampling tubes in the present invention is not limited to the above described configuration. In the second embodiment, as shown in FIG. 2, sampling tubes 104' are, for example, disposed on different vertical lines (dash lines V1, V2). Furthermore, in other embodiments, the ion exchange resin tower has an end sampling tube, located at a position corresponding to the junction point between the output line and the tank. Furthermore, those skilled in the art can adjust the number of the sampling tubes, the distribution pipes, and the water-collecting pipes depending upon their actual requirements.

Referring to FIG. 1, in the first embodiment, after the liquid has been introduced into the tank 101 via the supply line 102, the liquid flows through the distribution pipe 106 and enters the ion exchange resin 105 with a height of, for example, 4 h, to perform ion exchange. After performing the ion exchange, the liquid leaves the ion exchange resin 105, and then the liquid is collected by the water-collecting pipe 107 and introduced out via the output line 103, and thus the liquid is introduced out of the ion exchange resin tower 100. The processed liquid may enter other processing units for further processing or may be directly utilized. It should be noted that, meanwhile as the liquid flows through the tank 101, the sampling tubes 104a, 104b, 104c, and 104d are used to sample the liquid flowing through the ion exchange resin 105 at each height where the sampling tubes 104a, 104b, 104c, and 104d are respectively located. For example, the sampling tubes 104a, 104b, 104c, and 104d are removable from the sidewall of the tank 101, such that the liquid in the sampling tubes 104a, 104b, 104c, and 104d may be transferred to some other sites for further analysis.

FIG. 3 is a schematic view of a detection system according to a third embodiment of the present invention.

Referring to FIG. 3, a detection system 200 includes the ion exchange resin tower 100 of the first embodiment and a detection unit 120. The detection unit 120 is used to detect the liquid sampled by the sampling tubes 104. It should be noted that, the liquid sampled by the sampling tubes 104 may be transferred to the detection unit 120, and the transferring mode is, for example, connecting through lines, or removing the sampling tubes from the tank to transfer manually. The detection unit 120 is, for example, a probe electrode, sodium ion detector, boron detector, and silica detector, and thus the resistance of the liquid, concentration of sodium ions, concentration of boron ions, and concentration of silica in the liquid may be obtained to serve as the reference for detecting the water quality. It should be noted that, as the liquid in the sampling tubes 104 does not need to be recycled, the detection unit 120 may perform destructive or long-term precise analysis on the sampled liquid to get further information of the water quality.

The present invention further provides a detection method. FIG. 4 is a flow chart of a detection method according to the present invention. The detection method is capable of detecting the lifetime of the ion exchange resin 105 in the ion exchange resin tower 100 of the first embodiment. It should be noted that, the ion exchange resin 105 is divided into an ion exchange resin 105a, an ion exchange resin 105b, an ion exchange resin 105c, and an ion exchange resin 105d. The ion exchange resin 105a, 105b, 105c, and 105d have the same height h. Referring to FIGS. 1 and 4, in Step S401, according to the liquid sampled by each of the sampling tubes 104a, 104b, 104c, and 104d at different heights, whether the ion exchange resins at the same height as the corresponding sampling tubes 104a, 104b, 104c, and 104d are saturated or not is judged. For example, the liquid of the sampling tube 104a is used to judge whether the ion exchange resin 105a is saturated or not. The process for judging whether the ion exchange resin is saturated or not is, for example, measuring whether the resistances of the liquid in the sampling tubes 104a, 104b, 104c, and 104d have exceeded a default value or not. The default value is, for example, 18 MΩ-cm. That is, if the resistance of the liquid of the sampling tube 104a is less than 18 MΩ-cm, it is judged that the resin 105a is saturated and cannot perform ion exchange any more.

Next, in Step S402, when the liquid sampled by each of the sampling tubes 104a, 104b, 104c, and 104d shows that the ion exchange resin at one vertical height level is saturated, the used lifetime of the ion exchange resin is calculated. For example, the ion exchange resin 105a may be judged to be saturated or not according to the liquid sampled by the sampling tube 104a. When the liquid sampled by the sampling tube 104a shows that the ion exchange resin 105a is saturated, the used lifetime of the ion exchange resin 105a is calculated and recorded. Then, the lifetime of the ion exchange resin 105b, 105c and, 105d are calculated and recorded by the same manner.

Thereafter, in Step S403, according to the used lifetime of the ion exchange resin 105a, 105b, 105c, and 105d, the remaining lifetime of the ion exchange resin 105 is estimated.

The detection method is illustrated through a fourth embodiment. Referring to FIG. 1, when the ion exchange resin tower 100 begins to operate, the resistance of the liquid in the sampling tubes 104a, 104b, 104c, and 104d is judged in real time or judged at a predetermined time. After the resin tower 100 has operated for a time of T1, if the resistance of the liquid in the sampling tube 104a is less than 18 MΩ-cm, and the resistances of the liquids in the other sampling tubes 104b, 104c, and 104d are still greater than 18 MΩ-cm, it indicates that the resin 105a is almost saturated. That is, the used lifetime of the resin 105a with the height h is T1. As the heights of the other resins 105b, 105c, and 105d are totally 3 h, it can be estimated that the remaining lifetime of the resin is about 3 T1. That is, after the resin tower 100 operates for a further time period of 3 T1, the whole ion exchange resin 105 should be renewed.

However, in order to make the method of estimating the lifetime (remaining lifetime) of the ion exchange resin 105 be more accurate, the time point at which the resistance of the liquid in the sampling tube 104b gets to be less than 18 MΩ-cm may be continuously recorded. For example, after the time point T1, the resin tower 100 continuously runs for a time period T2, and at this time, the resistance of the liquid in the sampling tube 104b is less than 18 MΩ-cm, and the resistances of the liquids in the other sampling tubes 104c, and 104d are still greater than 18 MΩ-cm, it indicates that the used lifetime of the resin 105b with the height h is T2. Meanwhile, it may be assumed that the average used lifetime of the resin 105a and 105b with the height h is about (T1+T2)/2. As the heights of the rest of the resins 105c and 105d are totally 2 h, it can be estimated that the remaining lifetime of the resin is about (T1+T2). Similarly, after an additional time period of T3, if it is found the resistance of the liquid in the sampling tube 104c is less than 18 MΩ-cm, the lifetime of the resin with the height h can be amended to be (T1+T2+T3)/3. As the height of the rest of the resin 105d is h, it can estimated that after the resin tower 100 has operate for an additional time period of (T1+T2+T3)/3, the resin 105 should be renewed. Therefore, after it is found that the resistance of the liquid in the sampling tube 104c is less than 18 MΩ-cm, there is abundant time to make preparations for renewing the resin.

Furthermore, the calculated lifetime of the resin can be used as a reference value for the lifetime of the same kind of resin when it is used next time.

It should be noted that, the present invention is not limited to the ion exchange resin tower having sampling tubes disposed equidistantly. When the sampling tubes are not disposed at an equal distance, the lifetime (remaining lifetime) of the resin can be estimated according to the ratio of the differences in horizontal height levels of the sampling tubes and the time differences for the corresponding resins to get saturated.

Since the ion exchange resin tower of the present invention has sampling tubes, not only the water quality can be monitored in real time by detecting the liquid in the sample tubes, but also a destructive or long-term precise analysis can be further performed on the liquid, so as to ensure the stability of the liquid. Furthermore, the lifetime (remaining lifetime) of the resin in the ion exchange resin tower can be evaluated by using the liquid sampled at different heights, so as to serve as the reference for renewing the resin. Therefore, the present invention is capable of monitoring the water quality and is beneficial for effectively reducing the cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. An ion exchange resin tower for processing a liquid, comprising:
   a tank having an ion exchange resin for absorbing ions in the liquid;
   a supply line connected to a top portion of the tank, the supply line guiding the liquid into the tank;
   an output line connected to a bottom portion of the tank, the output line guiding the processed liquid out of the tank; and
   a plurality of sampling tubes disposed on a sidewall of the tank, wherein each of the sampling tubes is respectively disposed at a different vertical height level and the sampling tubes are substantially distributed on different vertical lines, for sampling the liquid flowing through the ion exchange resin.

2. The ion exchange resin tower as claimed in claim 1, wherein the liquid comprises water.

3. The ion exchange resin tower as claimed in claim 1, further comprising a plurality of distribution pipes connected to the supply line and located between the ion exchange resin and the supply line.

4. The ion exchange resin tower as claimed in claim 1, further comprising a plurality of water-collecting pipes connected to the output line and located between the ion exchange resin and the output line.

5. The ion exchange resin tower as claimed in claim 1, wherein the differences between the vertical height levels of the sampling tubes are substantially the same.

6. The ion exchange resin tower as claimed in claim 1, wherein the sampling tubes are removable from the sidewall of the tank.

7. The ion exchange resin tower as claimed in claim 1, further comprising an end sampling tube corresponding to a junction point between the output line and the tank.

8. A detection system, comprising the ion exchange resin tower as claimed in claim 1 and a detection unit, wherein the detection unit is applicable for detecting a sampled liquid of each sampling tube in the ion exchange resin tower.

9. The detection system as claimed in claim 8, wherein the detection unit comprises a probe electrode.

10. A detection method for calculating a lifetime of the ion exchange resin in the ion exchange resin tower as claimed in claim 1, comprising:

judging whether the ion exchange resin at different vertical height levels is saturated or not according to the liquid sampled by each of the sampling tubes;

calculating a use time of the ion exchange resin when the liquid sampled by each of the sampling tubes shows that the ion exchange resin at one vertical height level is saturated; and estimating the remaining lifetime of the ion exchange resin according to the use time.

11. The detection method as claimed in claim 10, wherein the process for judging whether the ion exchange resin is saturated or not comprises measuring whether the resistance of the liquid exceed a default value or not.

12. The detection method as claimed in claim 10, wherein the default value is about 18 MΩ-cm.

\* \* \* \* \*